United States Patent [19]
Zinn et al.

[11] Patent Number: 5,696,733
[45] Date of Patent: Dec. 9, 1997

[54] METHOD FOR VERIFYING THE LOCATION OF AN ARRAY OF SENSORS

[75] Inventors: Noel Donald Zinn, Missouri City; Ronald Edward Chambers, Houston, both of Tex.

[73] Assignee: Western Atlas International Inc., Houston, Tex.

[21] Appl. No.: 739,973

[22] Filed: Oct. 30, 1996

[51] Int. Cl.$^6$ .................................................. G01V 1/38
[52] U.S. Cl. ................................................... 367/19
[58] Field of Search ........................... 367/19, 127, 129, 367/130

[56] References Cited

U.S. PATENT DOCUMENTS

| | | | |
|---|---|---|---|
| 4,446,538 | 5/1984 | Zachariadis | 367/19 |
| 4,641,287 | 2/1987 | Neeley | 367/19 |
| 4,870,626 | 9/1989 | Tveit | 367/130 |
| 5,128,904 | 7/1992 | Chambers | 367/129 |
| 5,497,356 | 3/1996 | Behrens | 367/6 |

*Primary Examiner*—Ian J. Lobo
*Attorney, Agent, or Firm*—William A. Knox

[57] ABSTRACT

A high-order polynomial regression curve is fitted to a global set of first arrival times as a function of the nominal ranges between a plurality of acoustic sources having known geodetic coordinates and a plurality of acoustic detectors whose coordinates are imperfectly known. The order of the polynomial is chosen to be that order that minimizes the variance of the parameters about the regression curve. The polynomial is used as a quasi-velocity function for iteratively optimizing the best estimate of the ranges between each detector and every source station. The best estimate of the detector position is derived by multi-lateration using the computed ranges.

11 Claims, 8 Drawing Sheets

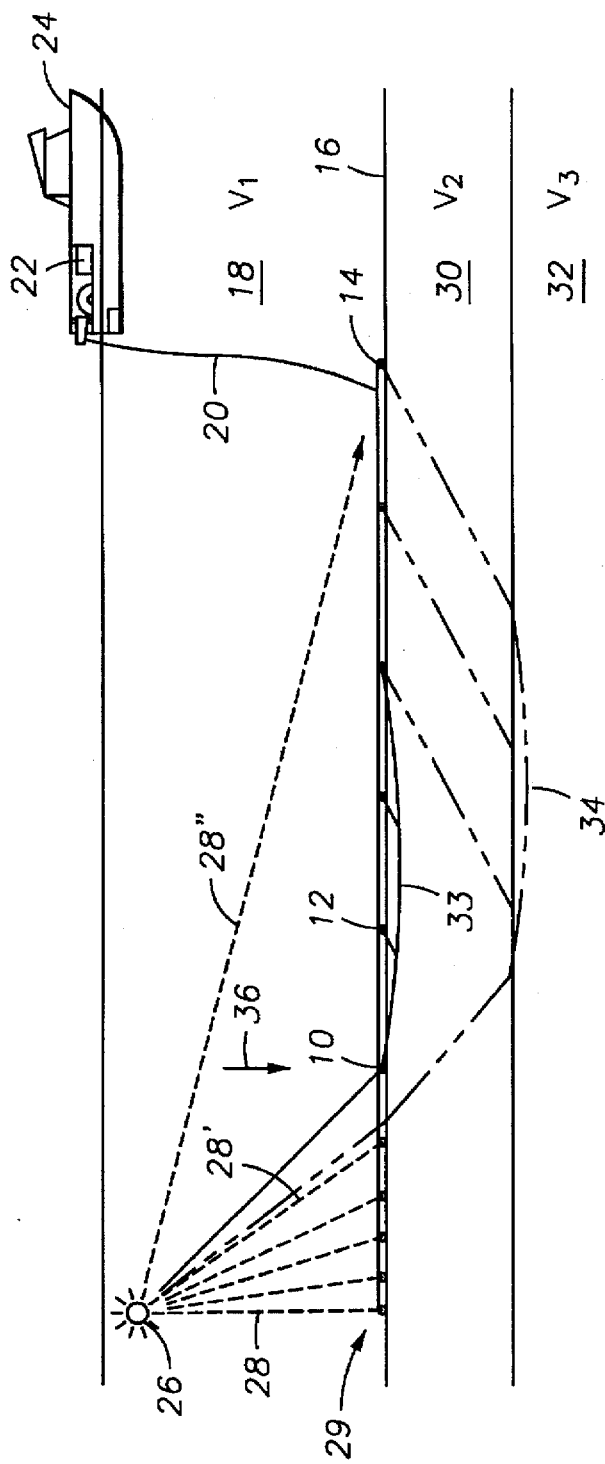
FIG. 2
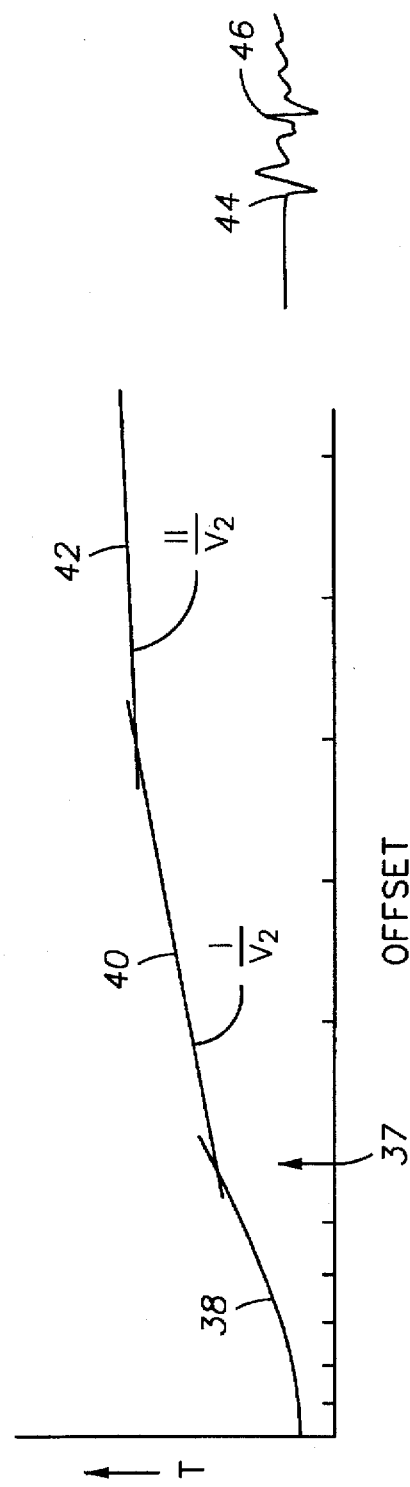
FIG. 3
FIG. 4

METHOD FOR VERIFYING THE LOCATION OF AN ARRAY OF SENSORS

BACKGROUND OF THE INVENTION

1. Field of the Invention

A method for refining the location, relative to known source or detector positions, of the individual members of an array of detectors or sources.

2. Discussion of Relevant Art

Although this method may be applied to land or marine seismic exploration, the method will be described by way of example but not by way of limitation, in terms of shallow-water marine seismic surveying. The exemplary situation envisions the source locations to be accurately known while the detector locations are uncertain. Of course, the reverse situation may hold, that is, the source locations may be the uncertain parameters.

As is well known in the Geophysical Profession, a sound source of any desired type radiates a wavefield into the earth from a each of a plurality of areally-disposed source locations according to a prescribed operational sequence. A plurality of spaced-apart seismic detectors are deployed in an areal pattern or array over the region of interest. The detectors receive the respective wavefields after the wavefields have traveled from the source(s) to the receiver(s) along various trajectories. As is well known, the sensors convert the mechanical earth motions due to direct, refracted and reflected seismic waves to electrical signals. The electrical signals representative of the seismic events are transmitted by any desired means to a recording apparatus. There, the electrical analog signals comprising the seismic data are digitized and recorded on an archival storage medium such as magnetic tape or floppy disc, for delivery to a data processing center. The resulting seismic data are processed, preferably by a programmed computer, to provide a geologic model of the subsurface of the earth in the region of interest. Commonly, the model is three-dimensional in terms of east and north coordinates horizontally and in depth along the vertical axis. From inspection of the geologic model of the subsurface, one can take steps to exploit the natural resources resident thereat for the benefit of humankind.

In a marine seismic survey in water depths of 200 meters or less, the seismic sensors are often emplaced directly on the sea floor by a cable boat before beginning the survey. The respective sensors are electrically coupled to signal-transmission means incorporated in one or more bottom cables. The ends of the cable(s) are adapted to be recovered by a recording boat for connection to a recording apparatus mounted thereon. The detector output signals, due to wavefield insonification of the subsurface by one or more sound sources mounted on a shooting boat, are then recorded as explained in the previous paragraph.

During the progress of a survey, the shooting boat visits in sequence each one of a plurality of designated, regularly-spaced source stations disposed in the area of interest. The geographic location of the shooting boat and hence also the acoustic source, can be measured very accurately by use of, for example, GPS satellite positioning equipment mounted on the boat.

Satellite positioning for the cable boat(s) is available so that a detector or sensor and associated cabling may be dropped into the water at nominally-designated sensor locations. But there is no assurance that a sensor, fluttering down through the water, will actually land at the desired position on the sea floor. Because the detectors and cables may be laid out many days or weeks before the actual survey operation begins, sea currents may displace the detectors or the nets of fishing boats may snag and drag them from their assigned stations. Because they are submerged, GPS positioning data are not available to the detectors.

Thus, although the position of the source may be known accurately and the position of the cable boat at the time of detector drop may also be known, the actual location of a detector on the water bottom is not necessarily known, only its "nominal" location, meaning a location such as might be selected from a wish list. Because of that uncertainty, the true geographic location of the geologic earth model derived from the resulting seismic data may be fraught with error, Workers in the profession have devised various methods for verifying the detector locations for ocean bottom cable arrays.

U.S. Pat. No. 4,446,538 issued May 1, 1984 to R. G. Zachariades teaches an acoustic positioning system for locating a marine bottom cable at an exploration site. The cable employs a plurality of hydrophones in spaced-apart positions along the cable. A marine vessel measures water depth to the cable as the vessel passes over the cable and then interrogates the hydrophones with sonar pulses along a slant range as the vessel travels along a parallel horizontally offset path to the cable. The location of the hydrophones is determined from the recordings of the water depth and the slant range. There is a disadvantage to that system, in that the auxiliary boat must make two passes over the cable, one pass to determine water depth and the second pass to generate a set of slant ranges.

Another method for locating a bottom cable is taught by W. P. Neeley in U.S. Pat. No. 4,641,287, issued Feb. 3, 1987. Here is disclosed a method for locating an ocean bottom seismic cable wherein a series of shots from a seismic pulse generator are fired. The distance to one seismic pulse detector is determined for each shot by defining spherical surfaces upon which the detector may be located. The intersection of the spherical surfaces determines the exact location of the detector. Depth detectors may be used to eliminate half the possible locations for each shot. In both of the above methods, in relatively shallow water where such bottom cables are used, the range measurements depend on measuring the elapsed time of a first-arriving acoustic pulse that has traveled directly through the water from source to detector and upon knowledge of the water velocity.

A somewhat different location-verification approach is taught by U.S. Pat. No. 5,128,904, issued Jul. 7, 1992 to Ron Chambers and assigned to the assignee of this invention. A method is disclosed for determining the separation between a seismic energy source and a seismic sensor whose location is known imperfectly. After the source emits a wavefield, the first-arriving impulse at the sensor is statistically processed to form a range statistic that is related to the travel time between the source and the sensor. A set of range statistics from a plurality of source positions are filtered and converted to range loci, the intersection of which marks the location of the sensor.

A method for verifying the location of a seismic bottom cable in real time is taught by J. P. Norton Jr, in U.S. Pat. No. 5,497,356, issued Mar. 5, 1996, and assigned to the assignee of this invention. In this teaching, one or more slave transponders are secured to selected sections of a seismic bottom cable whose location is imperfectly known. A Master transponder broadcasts an interrogation pulse from each of a number of different known locations distributed along a line of survey. In response to an interrogation pulse, a slave transponder emits an encoded reply signal that is received by the master transponder. The acoustic flight time between each pulse broadcast and the encoded-signal reception constitutes a range measurement in the participating slave transponder. Resolving a gather of several range measurements from different known broadcast locations, focussed on an identifiable transponder, defines the transponder's location. The disadvantage of this method resides in the need for special equipment, such as a sonar-type master transponder and special cable-mounted slave transponders, not necessarily found on a typical shallow-water field crew. Use of this method is limited to two-way ranges of about 500 meters, a limitation that is not helpful when detector arrays may extend for several kilometers. It is of interest that the '356 patent operates with direct arrivals, estimating ranges from the vertices of the hyperbolic arrival-time pattern. That patent denigrates the use of refracted arrivals in determining valid range measurements.

There is a need for a process for locating one or both members of a seismic source/detector pair relative to a known geodetic position. The process must be economical and require no special field equipment.

SUMMARY OF THE INVENTION

This invention provides a method for defining the real locations of the members of an array of detectors. The detectors are deposited at nominal locations, $D_i$, on the bottom earth formation beneath a body of water. The detectors are in communication with a seismic signal processing system through a signal transmission means of any desired type. An acoustic source is caused to sequentially visit each of a plurality of source stations which occupy known geodetic locations $S_j$. At each source station, the source launches an acoustic wavefield. A set of nominal ranges, $R^n_{i,j}$ is determined between every known source location, $S_j$, and every nominal detector location, $D_i$. With the aid of the signal processing system, detector signals are measured that are representative of the minimum wavefield travel times between every known source station and every nominal detector location to define a set of pick times, $P_{i,j}$ corresponding to the set of nominal ranges $R^n_{i,j}$. With the aid of the signal processing system, a global polynomial regression curve of the $R^n_{i,j}$ is fitted on the $P_{i,j}$. For every pick time $P_{i,j}$, a detector specific velocity trend is selected from said polynomial regression curve to define a set of detector-specific computed ranges $R^c_{i,j}$. For every pick time $P_{j,i}$, a source-specific velocity trend is selected from said polynomial regression curve to define a set of source-specific computed ranges $R^c_{j,i}$. Using the sets of computed ranges, the detectors are multi-laterated to a new re-positioned detector location. The computed ranges are substituted for the nominal ranges and the process is iteratively executed until the difference between the new re-positioned detector location and the previously-defined detector location converges to a predefined limit.

In an aspect of this invention, the polynomial regression curve is truncated between preselected range limits to avoid contamination by undesired transients.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 2 is a schematic view of a cross section of the earth, showing various trajectories followed by sound waves propagating through the earth after insonification by a sound source;

FIG. 3 is a schematic travel-time/range graph that might result from the geometry of FIG. 2;

FIG. 4 is an illustration of first and second arrivals as might be seen on an oscillographic time scale trace;

DETAILED DESCRIPTION OF THE PREFERRED EMBODIMENT

There follows now, a brief tutorial in association with FIGS. 1–4 to aid in the understanding of the method of this invention and to define the terminology adapted herein.

Figure 1:
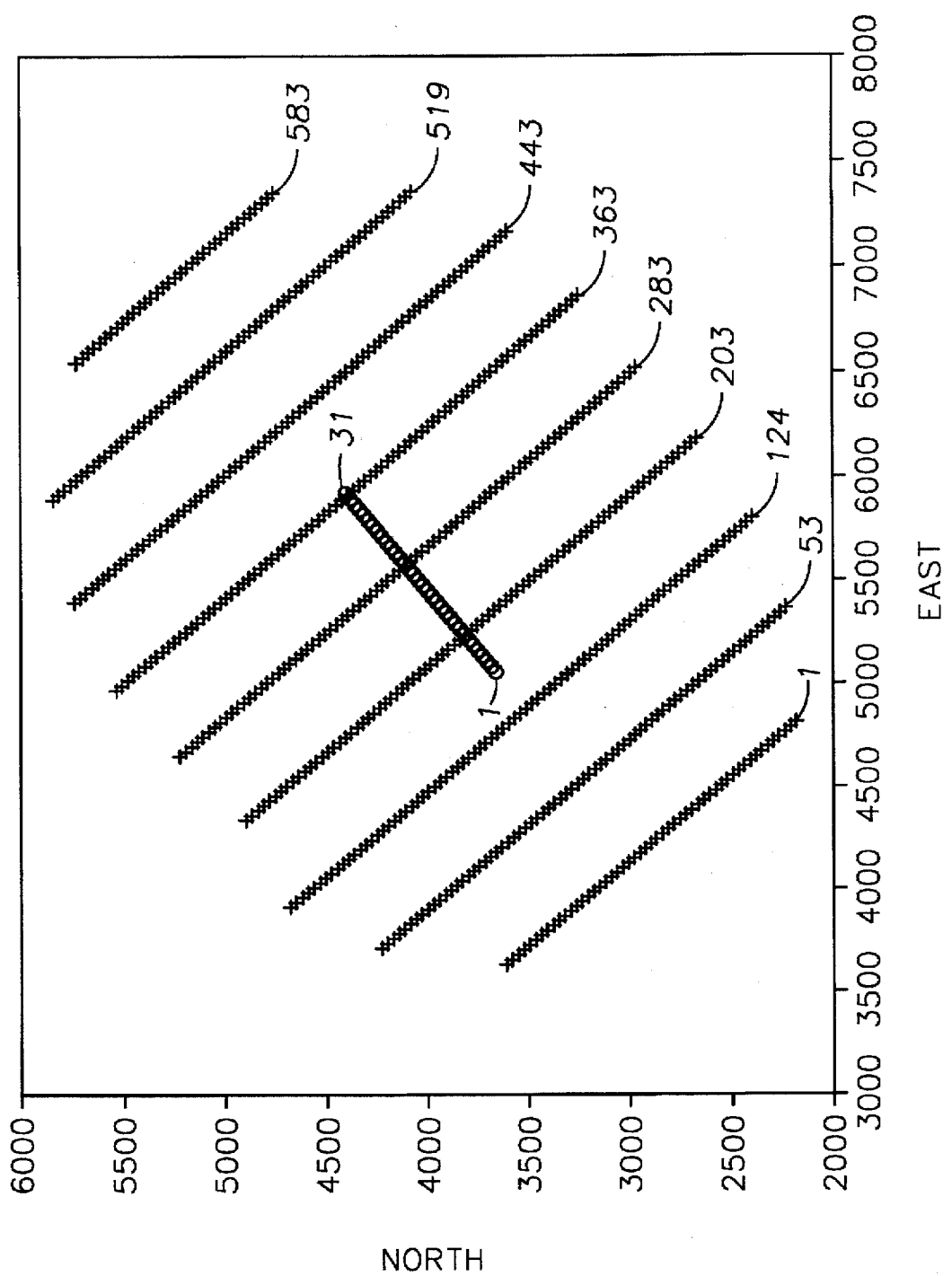
FIG. 1 is a plan view of an exemplary area undergoing a survey showing a plurality of 619 sources (x's) surrounding a linear array of 31 detectors (o's)

Referring first to FIG. 1, there is shown the general field layout of the acoustic source stations (x's) and detectors (o's) as might be used, for example, in a 3-D seismic survey of an area of interest. The coordinates are shown as northings and eastings, in meters, from an arbitrary origin. The exemplary survey area occupies several square kilometers. Six hundred and nineteen source-station locations are distributed over the area, whence a sound source sequentially visits each of the locations to insonify the linear array of 32 detectors. The southwesternmost detector is identified by the reference numeral 1. The source-station identifications are shown at the southeastern ends of each line of source stations.

In FIG. 2 a plurality of seismic detectors such as 10, 12 and 14 (small circles) have been emplaced at nominal locations on the earth formation at the bottom 16 of a water layer 18. The detectors are in communication, via transmission means 20 with a seismic signal processing system 22 which may be mounted on a vehicle of any desired type such as a boat 24. Alternatively, the processing system could be installed in a land-based processing center such that the boat merely records the data on a suitable recording medium which is then shipped to the processing center for processing. A mobile acoustic source 26 of any desired type, sequentially visits the respective source stations such as shown in FIG. 1, which occupy known geodetic positions. A wavefield is launched from each of the respective source stations and received by all of the detectors after each launching.

Possible ray paths for the direct-path wavefield component are shown in FIG. 2 by short dashed lines such as 28, 28' and 28". A refracted ray path propagating through layer 30 is shown as a solid line 33. A refracted ray path through a deeper layer 32 is shown by long dashes 34. The ray paths associated with reflected arrivals, not being germane to this disclosure, are not shown.

Upon launching of a wavefield, the first-arriving pulses will be direct arrivals traveling along slant paths such as 28, 28'. If the travel time is plotted against the detector ranges from the sub-source point such as at 29, they will form one branch of a hyperbola. As is well known from refraction theory, at some point such as 36, termed the critical distance, the first arriving signals propagate along a refracted path such as 33. The critical distance is a function of the ratio of velocities $V_1$ and $V_2$, the velocities of the water and the water-bottom material respectively. Given a second refracting earth layer, arrivals from that layer become the first arrivals at greater ranges.

FIG. 3 is a schematic plot of first-arrival travel times plotted against range between a source and a detector. The direct arrivals, falling along curve 38, ahead of the critical point 37, exhibit hyperbolic curvature if left uncorrected for slant distance. Beyond the critical point 37, the direct arrivals become second events. If the events can be traced to the far field such as to detector 14 along ray path 28", the direct-arrival curve would become asymptotic to the hyperbola having slope $1/V_1$.

Beyond critical point 37, the first arrival travel times fall along a straight line, 40, having a slope of $1/V_2$, assuming an isotropic, flat-lying water-bottom layer 30. As the profile is extended farther from the source 26, arrivals from a deeper refracting layer 32 now appear as first arrivals as shown by the breakover at line 42 whose slope is $1/V_3$. Refracted signals from layer 30 now become second arrivals and the direct arrivals is present will be third arrivals.

FIG. 4 represents the initial portion of a time scale trace used for recording the arriving events of the propagating wavefield. A first-break transient or pick is indicated at 44. In the absence of noise or instrumental interference, the transient is clean and unambiguous as shown. A secondary-event arrival is shown at 46 such as might be due to a direct wavefield arrival from beyond the critical point 37.

As earlier indicated, the purpose of this invention is to provide a method for repositioning the nominal location of one or both members of a seismic source/detector pair. Given a precisely-known location for one of the members of the pair and an accurate measure of the wavefield traveltime between the members of the pair, the range between the two can be calculated if the propagation velocity characteristic of the material along the wavefield trajectory (travel path) is known or can be determined. From several such ranges, the location of the imperfectly-located member of the pair can be defined by multi-lateration (sometimes incorrectly referred to as triangulation). If the locations of both members of the pair are uncertain, certain well-known statistical filtering methods, such as Kalman filtering, are available.

In the Norton Jr. reference earlier cited, multi-lateration using direct arrivals of sonar-like pulses were used to relocate detector drop locations. As explained earlier, one disadvantage to that method is the complex calculations needed to handle the hyperbolic trajectories. Another problem was a limitation in range to line-of-sight or about 250 meters, one way. Because large areal surveys extend for many kilometers, that method had severe limitations.

Figure 5:
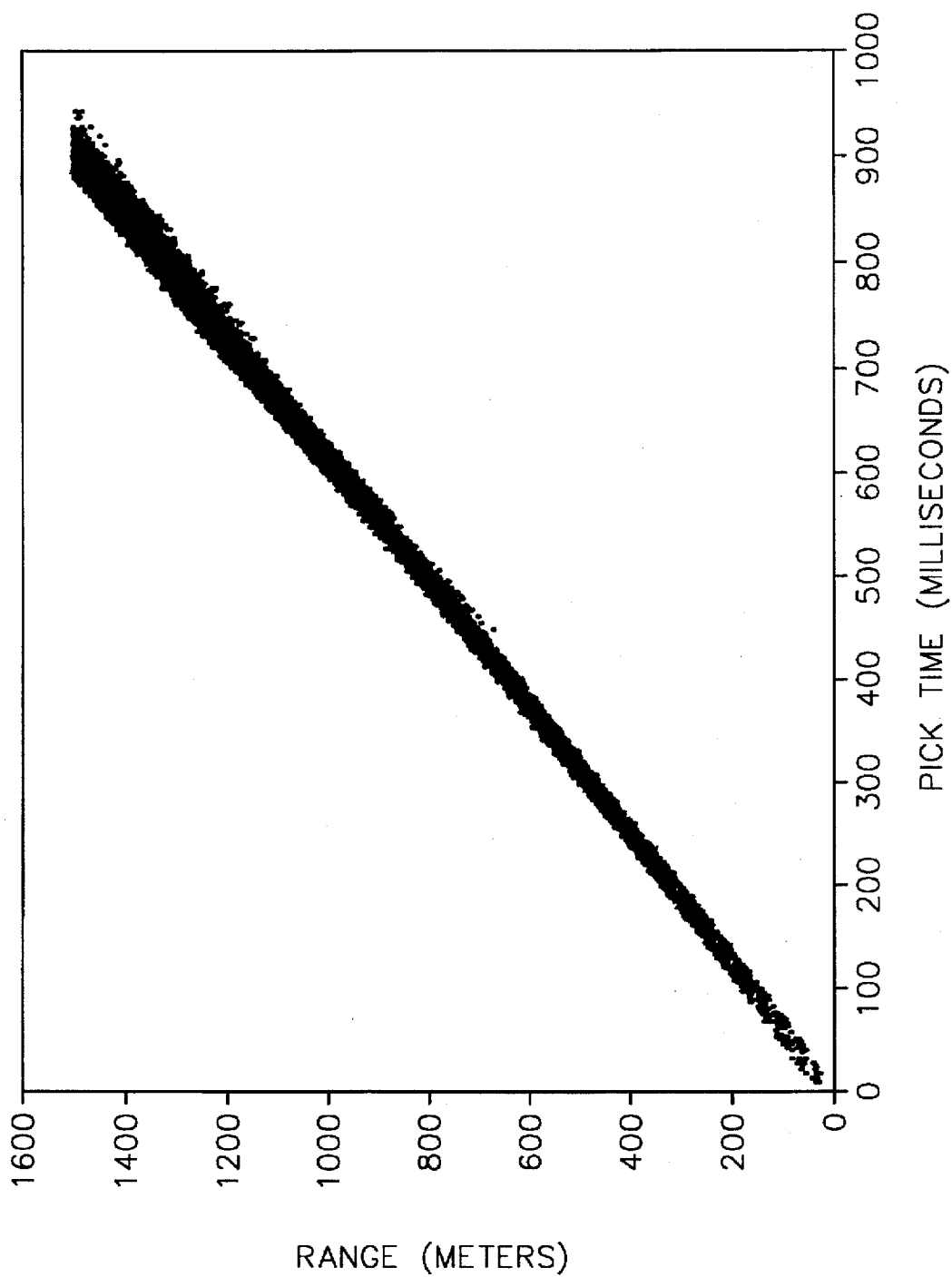
FIG. 5 is a plot of nominal ranges vs. first arrival times based on a linear regression of the raw field data.

We have found that it is possible to fit a global statistical polynomial regression curve of the nominal ranges between detectors and sources on the travel times of first-arriving refracted events such as shown in FIG. 5. In FIG. 5, the first-arriving travel times in milliseconds (x-axis) between every combination of source station and detector are plotted against the nominal range in meters (y-axis) for each combination, to create a raw regression plot 50. Since there are 619 sources and 32 detectors, there are nearly 20,000 data. The plot probably includes some early direct arrivals but for the most part they are believed to comprise refracted travel times through one or more shallow refractors. The term "shallow" means a refractor depth beneath the water-bottom surface that is less than the water thickness above the water-bottom.

A high-order polynomial regression curve having the form:

$$f(V)=A_0+A_1t+A_3t^2+\ldots+A_h t^{(h-1)},$$

can be fitted through the plotted points, 50. Inspection of the average trend 50 of the plotted points reveals a break in slope at a nominal range of about 500 meters such as might be due to arrivals through a second deeper refractor. The individual slopes may represent true velocities. But a regression curve fitted through all of the plotted points 50 taken as a whole, is best referred to as a quasi-velocity function because the velocities that defines its coefficients originate from various trajectories having dissimilar geometries.

We have found that the polynomial trend can be iteratively refined and that the resulting quasi-velocity function can be used as a wavefield propagation velocity in a multi-lateration process to reposition the locations of one or both members of a seismic source-station/receiver pair.

The data plotted in FIG. 5 comprise a raw global graph of first-arriving travel times, defined as pick times $P_{i,j}$, plotted against the nominal ranges, $R_{i,j}$ between the plurality of source stations and each member of the line of 32 detectors of FIG. 1.

The "nominal range" means the distance between a source station and the nominal location of a detector. The nominal range is computed by inversion of the source-station coordinates and the nominal detector coordinates by standard surveying methods. The term "global" means that every combination of travel time and nominal range has been plotted. The term "pick time" means the travel time of the first-arriving seismic transient, at a detector, resulting from a wavefield launching and which has propagated along a minimal-time refracted trajectory.

Every pick time $P_{i,j}$ is identified as to source station of origin, $S_j$ (j=1, ..., n) and nominal detector location $D_i$ (i=1, ..., m). Thus in this example, for every detector $D_i$, there is an associated set of 619 detector-specific pick times $P_{i,j}$. For every source station, there is an associated set of 32 source-specific pick times, $P_{j,i}$.

By use of the seismic data processing system 22, which may be a programmed computer, a high-order polynomial regression curve of nominal ranges $R_{i,j}$ on pick times $P_{i,j}$, is fitted to the data. Any well-known statistical processing routine may be used for that purpose. In FIG. 5, the high density of the plotted data points has obscured the line representing the actual regression curve. The order of the polynomial is selected as that order which minimizes the residuals about the regression curve on a least squares basis. In our experience, a third to fifth-order polynomial has proved to be satisfactory.

Outliers, that is random data that grossly depart from the main data sequence, are rejected in the curve-fitting process. Due to excessive shot-generated noise, pick times received by detectors near a source may be distorted by unwanted transients such as direct arrivals and shot noise. At extreme ranges, where the signal-to-noise ratio is very low, the pick times may be too noisy to be useful and/or the arrivals may have propagated along refracted paths that are too deep to be of use for geodetic purposes. Therefore, range data acceptable to the polynomial optionally may be truncated between preselected range limits with the range maxima being designed to confine the wavefield arrivals to those having propagated along shallow refracted trajectories.

Figure 6:
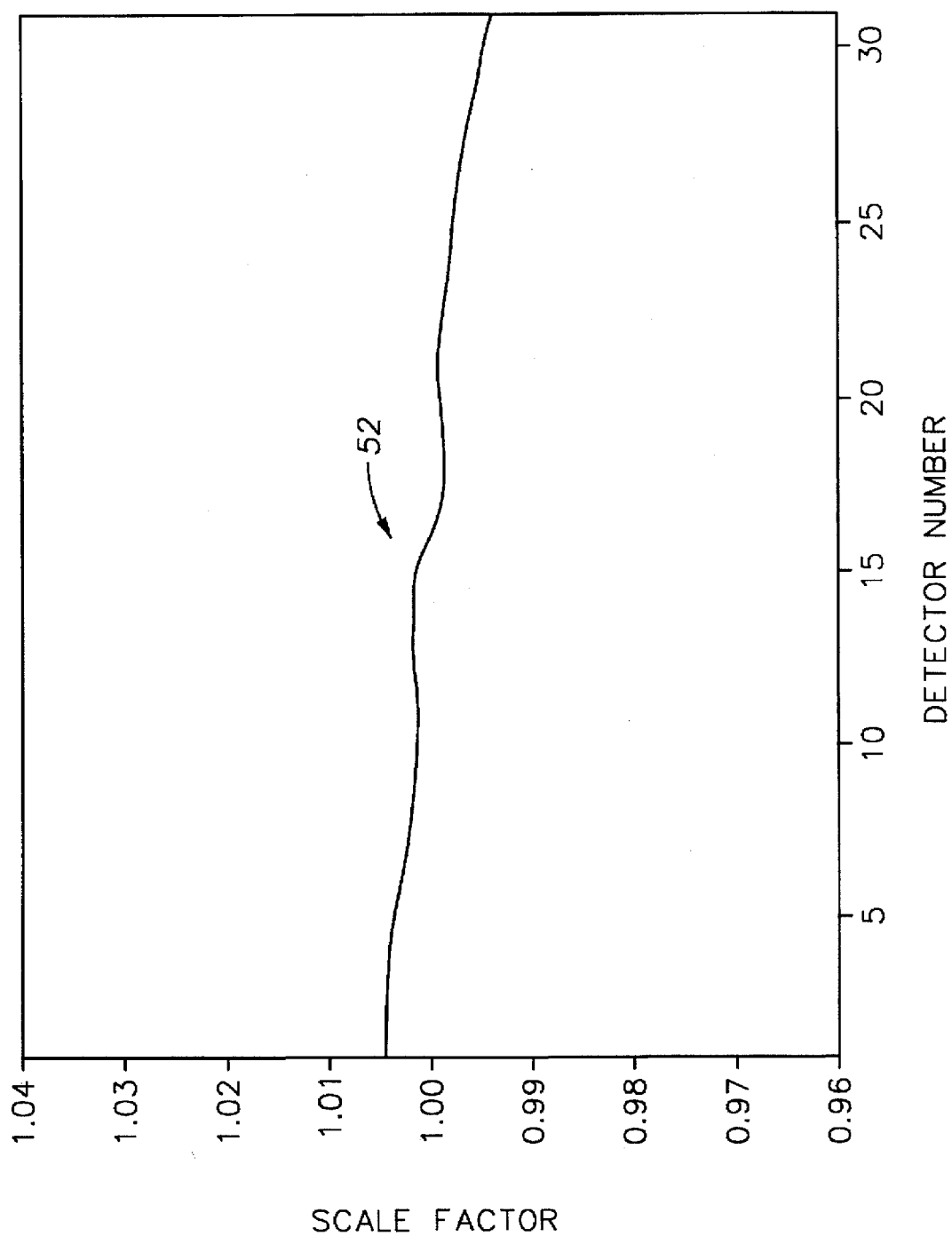
FIG. 6 shows the detector-specific velocity trend.

From the global regression curve, a set of computed ranges $R^c_{i,j}$ is computed from the set of detector-specific pick times. There are now two sets of detector-specific ranges: The set of nominal ranges $R^n_{i,j}$ and the set of computed ranges $R^c_{i,j}$ ($^c$ and $^n$ being set designators, not exponents). From those two sets, a detector-specific velocity trend 52 is determined such as shown in FIG. 6. The vertical scale is a dimensionless scale factor; the horizontal scale is detector number, corresponding to the detectors 1–31 shown in FIG. 1. The velocity trend is simply a scale factor that reflects the average difference between the nominal and computed ranges for each detector. Velocity trend 52 is relatively smooth because a very large number of detector/source-station observations are available.

Figure 7:
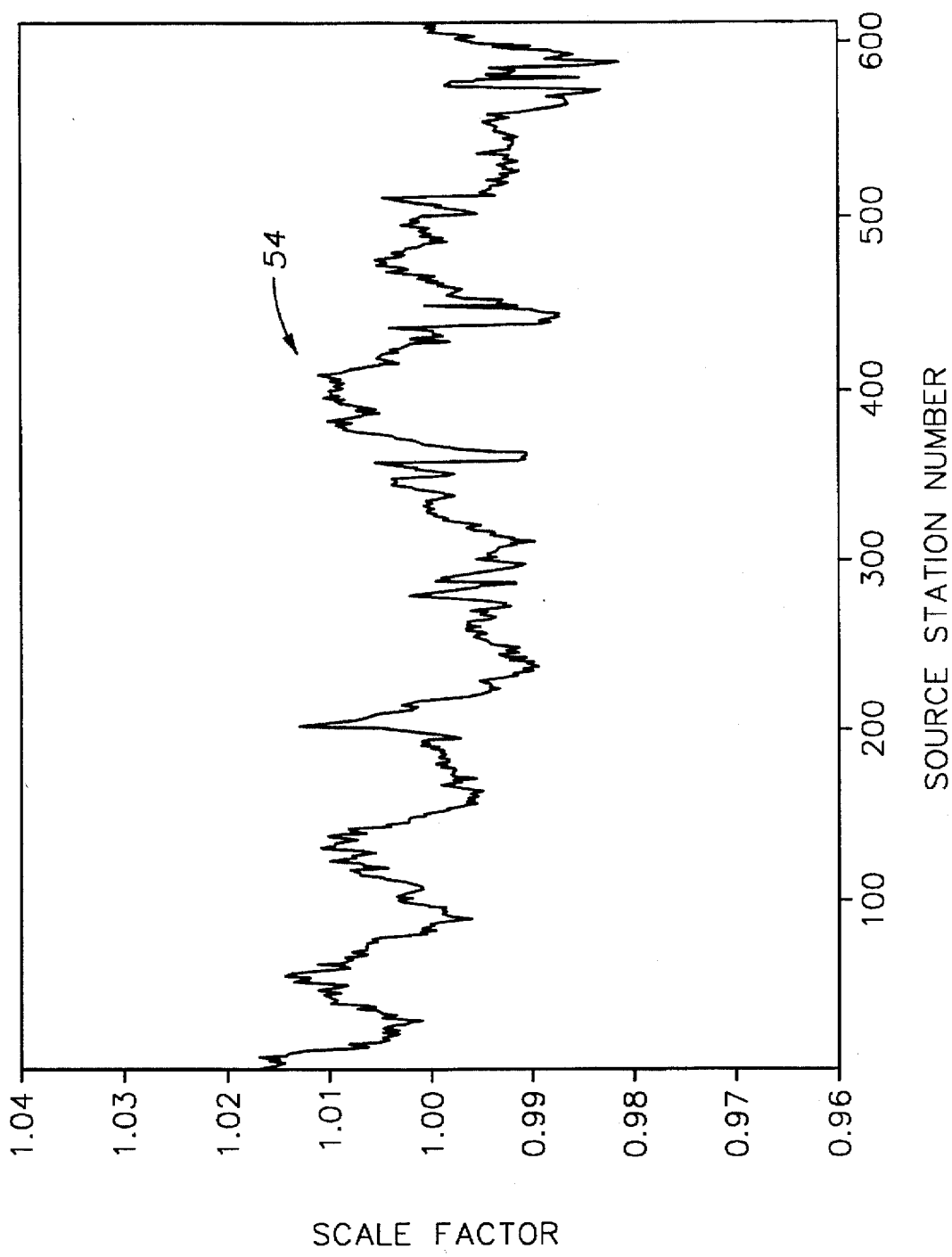
FIG. 7 shows the source-specific trends.

The above computations are repeated with respect to the source-specific pick times $P_{j,i}$ to provide a set of source specific ranges $R_{j,i}$ and for which a velocity trend, such as line 54 of FIG. 7, may be derived. Again, the vertical axis is a dimensionless scale factor and the horizontal axis is source-station number. The irregularity of the trend is due in part to the sparseness of the samples because of the relatively few detectors associated with each individual source station. The irregularities may also reflect local environmental influences on the scale factor.

Figure 8:
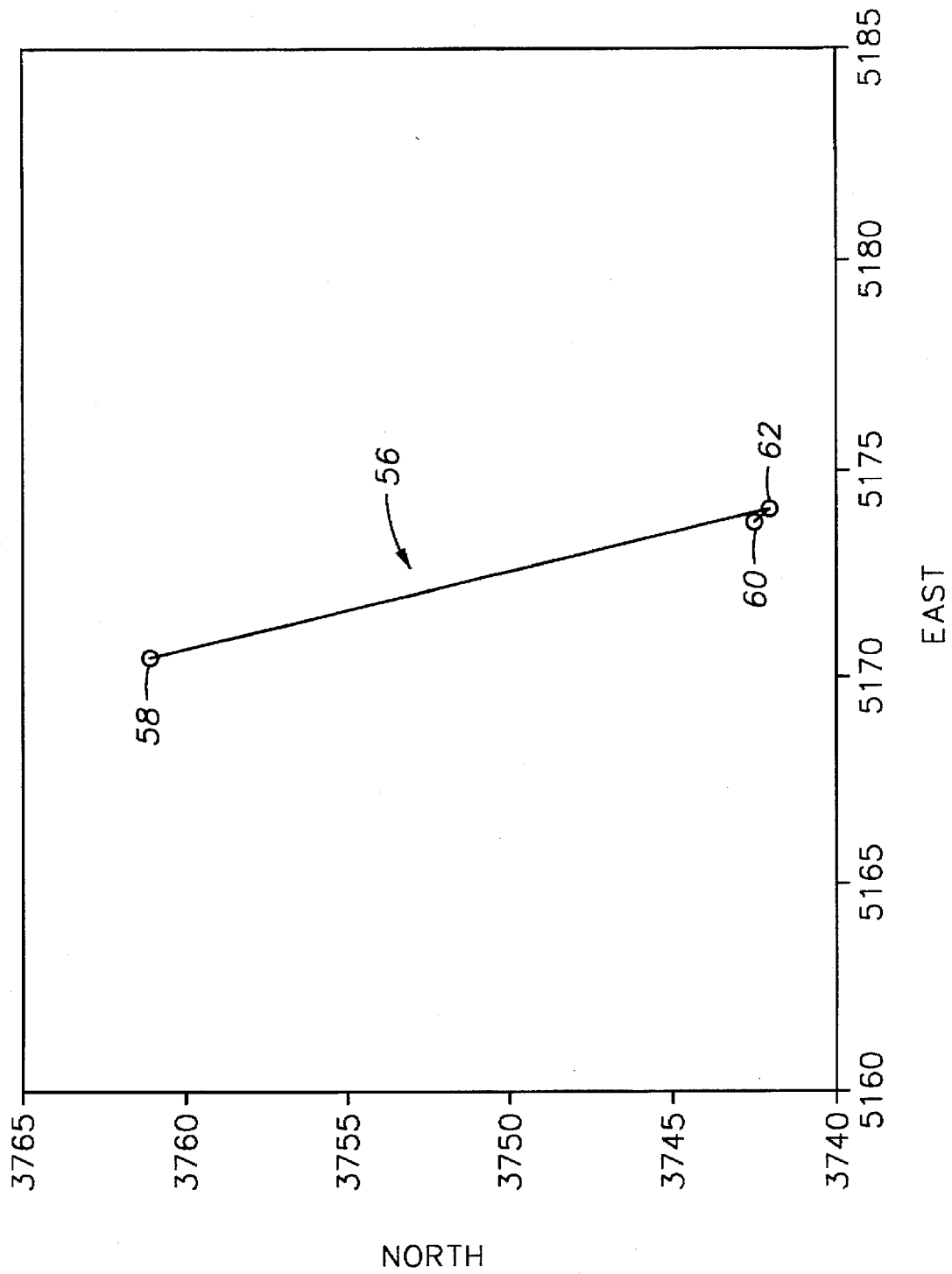
FIG. 8 illustrates the revised position of a detector after three iterations.

The detector coordinates are revised by multi-lateration on the basis of the computed ranges whereupon a new polynomial regression is fitted to the newly computed ranges as a function of global pick times and the above process is repeated until the difference between the previously determined coordinates and the subsequently-determined coordinates converges to a preselected limit such as 0.1 meter. In FIG. 8, graph 56 shows convergence of the position of detector #1, FIG. 1 from the drop position 58, through point 60 and finally to position 62 after three iterations. The radial error, dRMS is derived for each revised detector position by any well-known means. Well-known Kalman filtering may be employed as desired.

Figure 9:
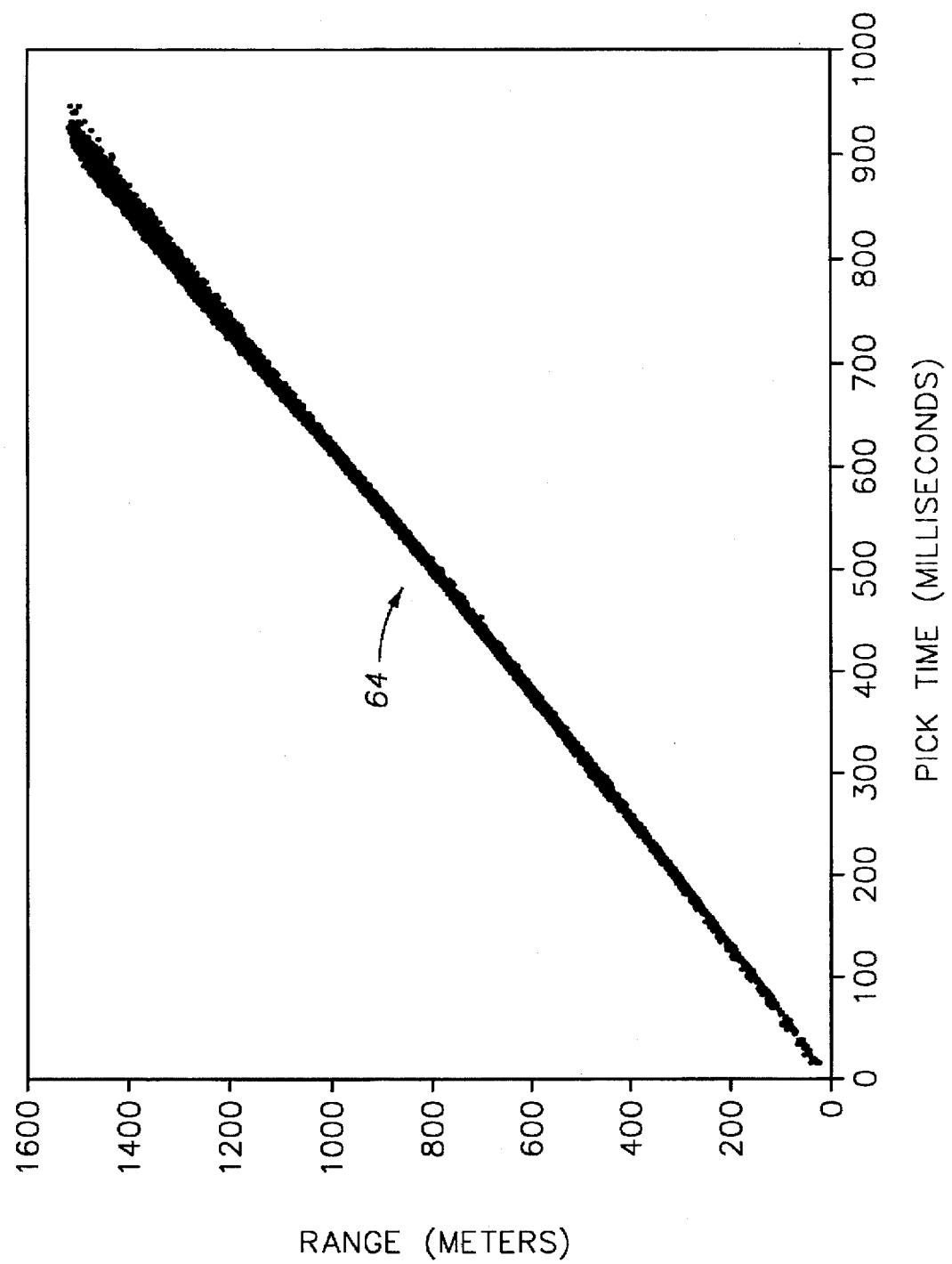
FIG. 9 shows the data of FIG. 5 after regression using a fifth-order polynomial.

In FIG. 9, 64 is the regression plot of the range/pick time data of FIG. 5 resulting from the final iteration using the 5th-order polynomial:

$$f(V)=2.07+1.64\tau-5.66\times10^{-4}\tau^2+1.43\times10^{-6}\tau^3-9.84\times10^{-10}\tau^4+9.24\times10^{-14}\tau^5.$$

where $\tau$ is pick time in seconds.

Figure 10:
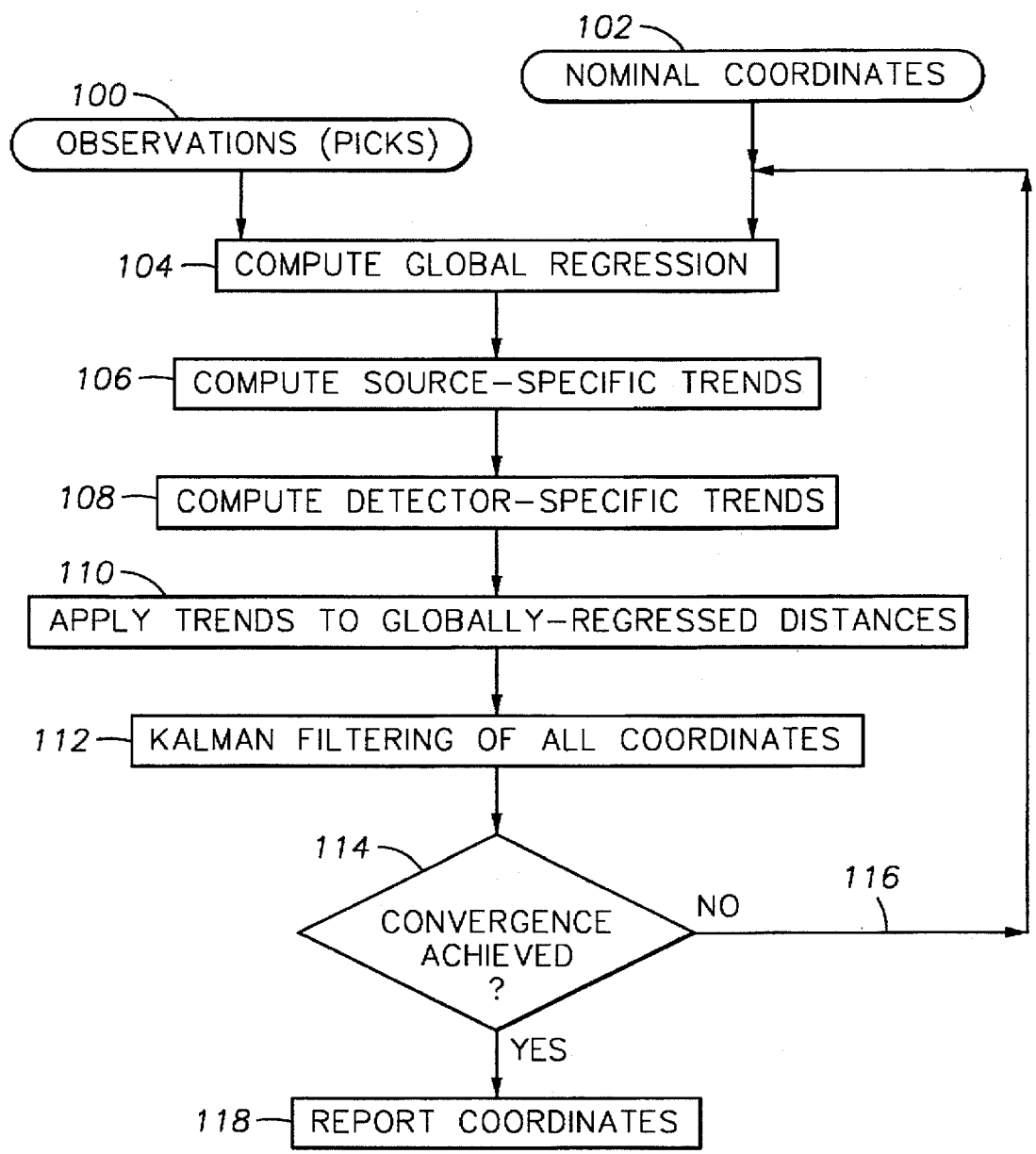
FIG. 10 is a flow diagram of the process of this teaching.

FIG. 10 is illustrative of the presently-preferred best mode of operation. The pick times are entered into data processor 22 at step 100 along with the nominal coordinates of the detectors at 102. From those data, a global regression curve is computed at step 104. Source and detector-specific trends are determined at steps 106 and 108 to derive scale factors for application to the globally regressed nominal coordinates to obtain calculated coordinates at 110. If required, filtering may be applied as in step 112. A convergence test is applied to the difference between the nominal and the computed ranges at step 114. If convergence has not been achieved, the process loops back through feedback loop 116 to 104 and the process is repeated. Upon convergence, the process terminates and the detectors are multi-laterated to their revised coordinates at 118.

This invention has been described with a certain degree of specificity by way of example but not by way of limitation. As explained earlier, this invention was described in terms of an exemplary marine survey wherein the locations of the source stations are known accurately as opposed to the detector locations which are merely estimates at best. The reverse situation may also exist wherein the source station locations are uncertain or, perhaps, both source-station and detector locations may be imperfectly known. Those skilled in the art will devise obvious variations to the examples given herein but which will fall within the scope and spirit of this invention which is limited only by the appended claims.

What is claimed is:

1. A method for defining the real locations of the members of an array of detectors, comprising:
   a) depositing the detectors at nominal locations, $D_i$, the detectors being in communication with a seismic signal processing system;
   b) causing an acoustic source to sequentially visit each of a plurality of source stations occupying known geodetic locations $S_j$, and to launch an acoustic wavefield therefrom;
   c) determining a set of nominal ranges, $R^n_{i,j}$ between every known source location, $S_j$, and every nominal detector location, $D_i$;
   d) measuring, with said signal processing system, detector-signal travel times representative of the minimum wavefield travel times between every known source station and every nominal detector location to define a set of pick times, $P_{i,j}$ corresponding to said set of nominal ranges $R^n_{i,j}$;
   e) with the aid of the signal processing system, fitting a global polynomial regression curve of the $R^n_{i,j}$ on the $P_{i,j}$;
   f) for every pick time $P_{i,j}$, selecting a detector specific velocity trend from said polynomial regression curve to define a set of detector-specific computed ranges, $R^c_{i,j}$;
   g) for every pick time $P_{j,i}$, selecting a source-specific velocity trend from said polynomial regression curve to define a set of source-specific computed ranges $R^c_{j,i}$.
   h) using the sets of computed ranges, multi-laterating the detectors to a new re-positioned detector location;
   i) substituting the computed ranges from step h) for the nominal ranges in step c), iteratively executing steps d) through h) until the difference between a new repositioned detector location and a previously-defined detector location converges to a predefined limit.

2. The method as defined by claim 1, comprising:
filtering the sets of pick times $P_{i,j}$, $P_{j,i}$ and the range sets $R_{i,j}$ and $R_{j,i}$ prior to executing step h).

3. The method as defined by claim 2, comprising:
selecting for execution, the order of said polynomial which minimizes the variance of the residuals about the regression curve.

4. The method as defined by claim 1, comprising:
rejecting wavefield arrivals falling inside a critical distance from the set of refracted pick times prior to executing step d).

5. The method as defined by claim 1, wherein:
the detector locations are known and the source-station-locations are imperfectly known.

6. The method as defined by claim 1, wherein:
said detectors are deposited on an earth formation beneath a body of water so that the pick times are representative of wavefield propagation along shallow refracted trajectories.

7. The method as defined by claim 1, further comprising:
truncating said polynomial between preselected range limits to minimize contamination of said pick times by undesired transients.

8. A method for estimating the actual locations of the members of an array of detectors beneath a body of water, comprising:

a) depositing the detectors at nominal locations, $D_i$, on the bottom of the body of water;

b) providing means for transmitting detector signals to a seismic signal processing system;

c) causing an acoustic source near the surface of the water to sequentially visit each of a plurality of source stations at known geodetic locations $S_j$, and to launch an acoustic wavefield therefrom;

d) by coordinate inversion, determining a set of nominal ranges, $R^n_{i,j}$ between every known source location $S_j$, and every nominal detector location, $D_i$;

e) measuring, with said signal processing system, detector-signal travel times representative of the minimum wavefield travel times between every known source station and every nominal detector location to define a set of pick times, $P_{i,j}$ corresponding to said set of nominal ranges $R^n_{i,j}$;

f) with the aid of the signal processing system, fitting a high-order global polynomial regression curve of the $R^n_{i,j}$ on the $P_{i,j}$;

g) for every pick time $P_{i,j}$, selecting a detector specific velocity trend from the aforesaid polynomial regression curve to define a set of detector-specific computed ranges $R^c_{i,j}$;

h) for every pick time $P_{j,i}$, selecting a source-specific velocity trend from said polynomial regression curve to define a set of source-specific computed ranges $R^c_{j,i}$ i) using the sets of computed ranges, multi-laterating the respective detectors to new re-positioned detector locations;

j) substituting the computed ranges from step h) for the nominal ranges in step d), iteratively executing steps e) through i) until the difference between a new repositioned detector location and a previously-defined detector location converges to a predefined limit.

9. The method as defined by claim 8, comprising:

minimizing undesired transient contamination of the pick times by limiting acceptance by said polynomial of only source-specific and detector-specific ranges within preselected maximum and minimum range limits.

10. The method as defined by claim 9, comprising:

filtering the sets of pick times $P_{i,j}$, $P_{j,i}$ and the sets of ranges $R_{i,j}$, $R_{j,i}$ prior to executing step i).

11. The method as defined by claim 8, comprising:

limiting the range maxima to confine acceptable pick times to those that are representative of wavefields propagating along refracted trajectories that are shallow with respect to the water bottom.

\* \* \* \* \*